Sept. 17, 1940.  A. MAESCHER  2,215,010
PRESSING APPARATUS
Filed Oct. 25, 1937   3 Sheets-Sheet 2
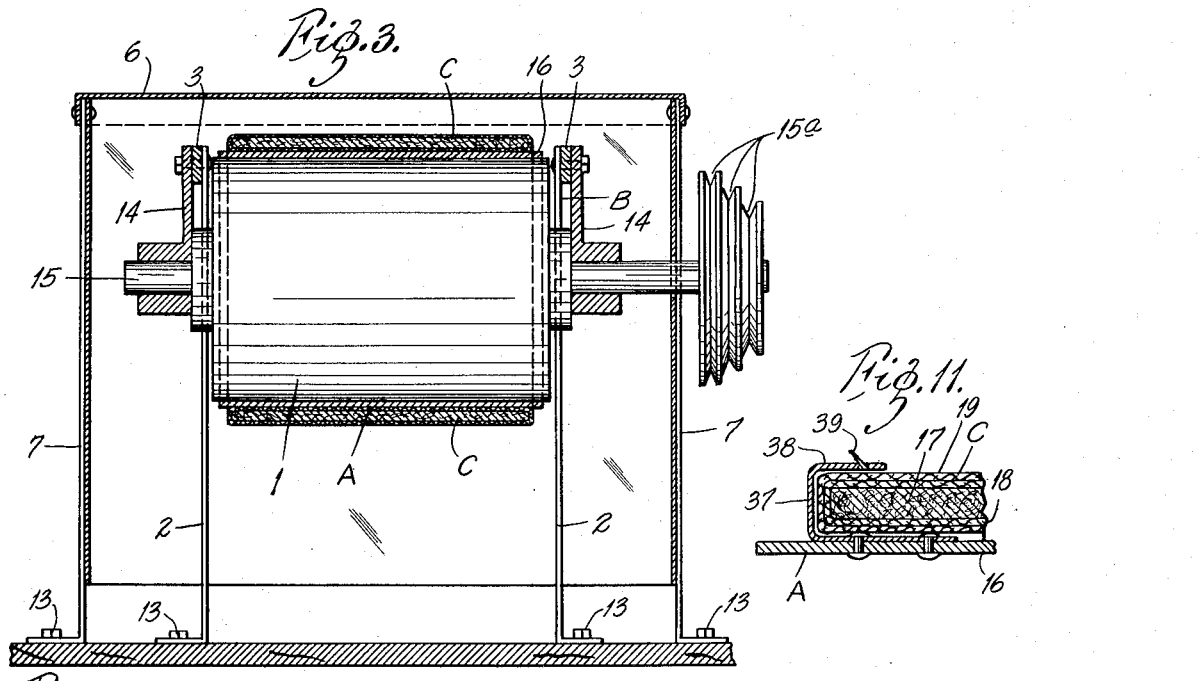
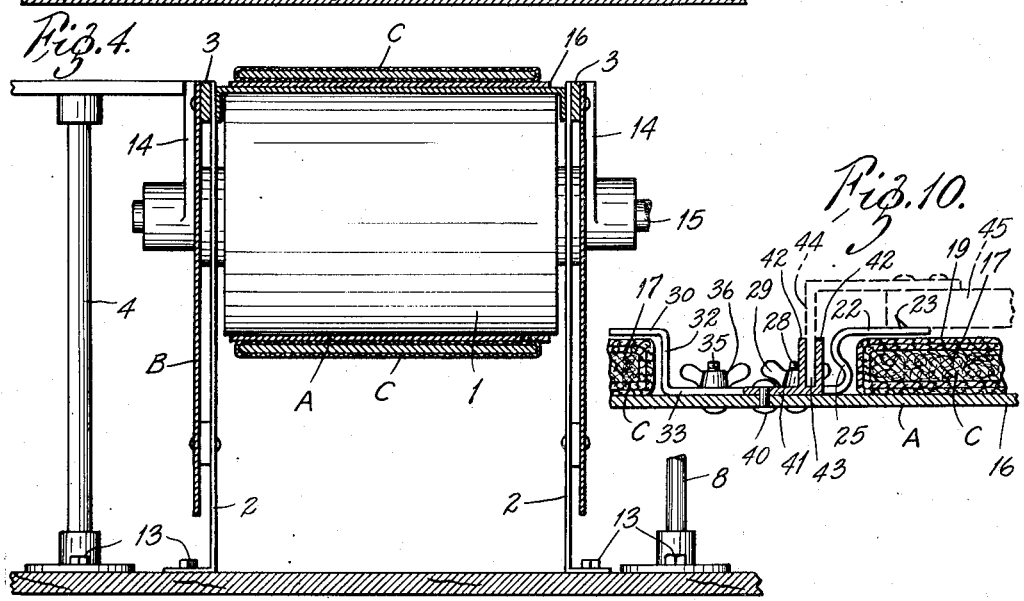
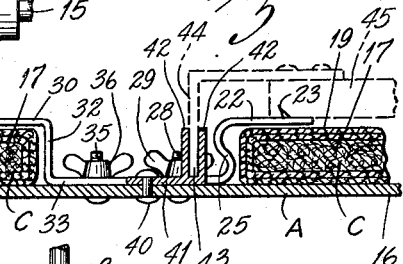
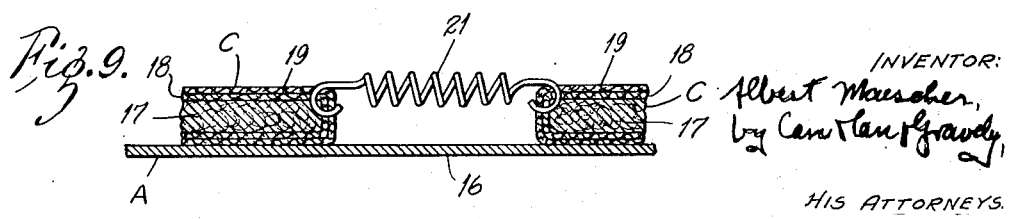

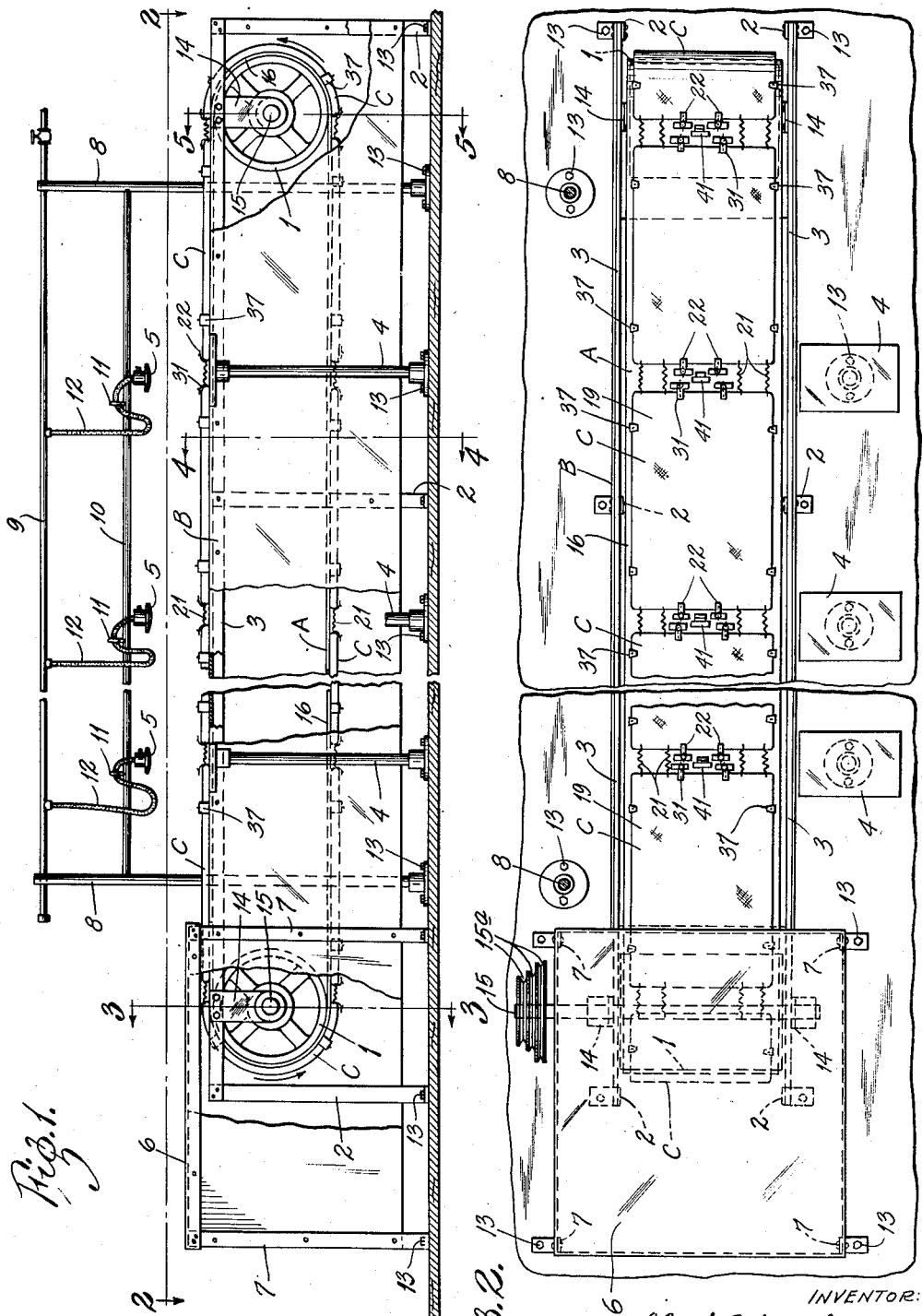

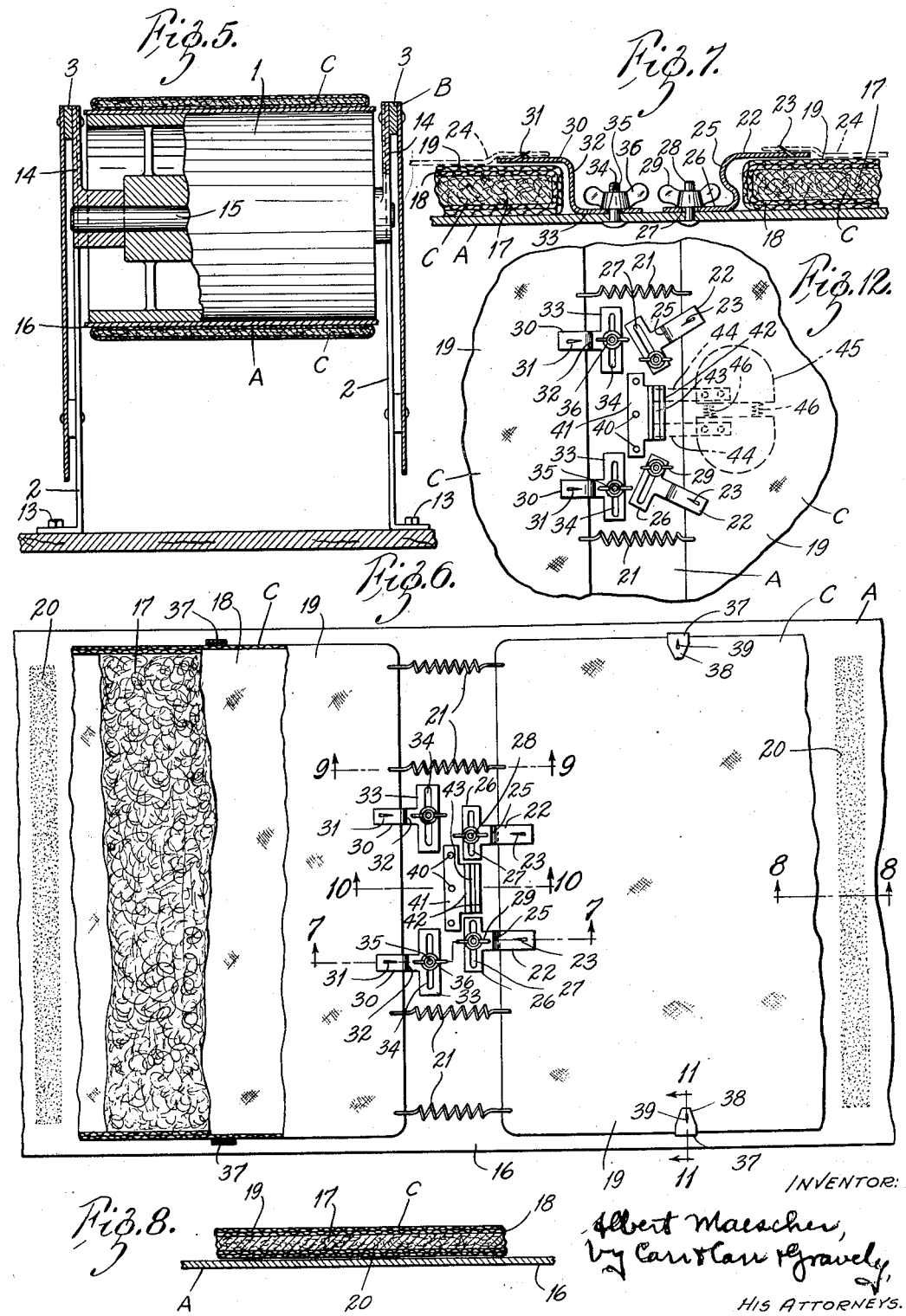

Patented Sept. 17, 1940

2,215,010

UNITED STATES PATENT OFFICE 2,215,010

PRESSING APPARATUS

Albert Maescher, St. Louis, Mo., assignor to Crown Manufacturing Co., St. Louis, Mo., a corporation of Missouri Application October 25, 1937, Serial No. 170,759

5 Claims. (Cl. 38—8)

My invention relates to pressing apparatus of the conveyor type particularly adapted for the pressing of shirts and other garments. The invention has for its principal objects to expedite, simplify and cheapen such operation as the ironing of shirts and other garments. The invention consists in the apparatus and in the parts and combinations and arrangements of parts hereinafter described and claimed.

In the accompanying drawings:

Fig. 1 is a side elevation of an apparatus for pressing embodying my invention,

Fig. 2 is a top plan view of the conveyor portion of the apparatus as indicated by the arrows 2—2 in Fig. 1, Fig. 3 is a vertical sectional view on an enlarged scale on the line 3—3 in Fig. 1, Fig. 4 is a vertical sectional view on the line 4—4 in Fig. 1, Fig. 5 is a vertical sectional view on the line 5—5 in Fig. 1, Fig. 6 is a plan view on a further enlarged scale of a portion of the conveyor, showing the pressing pads and associated devices, Fig. 7 is a sectional view on the line 7—7 in Fig. 6, Fig. 8 is a sectional view on the line 8—8 in Fig. 6, Fig. 9 is a sectional view on the line 9—9 in Fig. 6, Fig. 10 is a sectional view on the line 10—10 in Fig. 6, Fig. 11 is a sectional view on the line 11—11 in Fig. 6, and Fig. 12 is a partial plan view similar to Fig. 6, showing a collar block mounted on the conveyor.

The apparatus and system include an endless conveyor A, mounted on pulleys 1 or drums, a supporting frame B, including a plurality of vertical supports 2 and a pair of longitudinal frame members 3 secured to the tops of said vertical supports, pressing pads C mounted on said conveyor, a plurality of stanchions 4 constituting operator stands or positions on which sadirons may be mounted, a plurality of spray heads 5, one for each of said sadiron stands 4 and a table 6 whose legs 7 are taller than the vertical frame members 2, so that the table top 6 covers the end portion of the conveyor A and provides a convenient place for receiving work removed from the conveyor.

The vertical frame members 2, the stanchions 4, the table legs 7 and vertical posts 8 to which are secured a water supply pipe 9 for the spray heads 5 and a longitudinal support 10 to which are secured hooks 11 for supporting the flexible feed tubes 12 for said spray heads 5 are all secured to the floor in any suitable way, as by bolts 13.

The pulleys 1 are pivotally supported by hangers 14 depending from the longitudinal frame members 3 and the shaft 15 of one of said pulleys projects outwardly to be driven by any suitable means (not shown in the drawings). Said shaft is shown as having drive pulleys 15a of different sizes on its end, whereby it may be driven at different speeds.

The conveyor A is illustrated as constituting an endless belt 16 on which the presing pads C are mounted. Said pads preferably include a body 17 of felt or the like, an intermediate cover 18 of some substantial fabric such as duck or thin canvas and an outer ironing cover 19 of suitable material, such as cotton or any of the other textile fabrics commonly used to cover ironing boards. The several pads C are secured to the belt at their middle portions only by narrow bands of adhesive 20 extending transversely of the belt and the pressing pads. Thus, the pressing pads C are free from the belt throughout most of their length.

Adjacent pads C are connected together by a plurality of springs 21. These springs permit the pads to accommodate themselves to necessary movement, and particularly allow for the movement that is required as the pads C pass around the pulleys 1.

Overlapping the forward end of each pressing pad are clamp strips 22, each of which has an upwardly and forwardly pointed hook 23 by means of which the yoke portion of a shirt 24 may be engaged. Downwardly curving portions 25 of said strips terminate in a plate 26 that is provided with a slot 27 extending transversely of the belt and is secured to the belt 16 by means of a bolt 28 extending through said slot 27 and a wing nut 29 on said bolt 28. Thus, the positions of the clamping strips 22 may be adjusted to accommodate work of different sizes.

Overlapping the rear end of each pressing pad are similar clamp strips 30, each provided with an upwardly and rearwardly directed hook 31 adapted to engage the lower portion of the shirt 24 or other work. Each of said strips has a downwardly extending portion 32 that terminates in a plate 33 that has a slot 34 extending transversely of the belt and adjustably secured thereto by a bolt 35 and wing nut 36.

Mounted on the belt alongside the pads C are clips 37 whose upper portions 38 overhang the pads C and are provided with upstanding points 39 for engaging the sides of the work.

Secured to the belt as by rivets 40 between each set of plates 26 of the yoke clamp strips 22 is a plate 41 having spaced upstanding strips 42 forming a channel 43 in which may be received supporting arms 44 of a collar block 45 of any desired construction, many such blocks being available. The parts of the blocks are spread by springs 46 so that the blocks may engage the neck band of a shirt of the separate collar type. The clamps 22 may be swung out of operative position as shown in Fig. 12 when the collar blocks are used.

As each pressing pad C comes to the upper stretch of the belt, an operator will secure the work in position by means of the hooks at the front, rear and sides of the pad and then, as the pad travels slowly past the several ironing stands, the several operators will perform their several ironing operations, the spray heads furnishing a supply of water, if needed, and also final operation of folding and pinning the sheets together.

As each pad C reaches the end of the upper stretch of the conveyor belt, the folded and pinned shirt will be removed therefrom and placed on the work table from which it will be later removed for boxing or the like operation.

The above described system and apparatus have important advantages. The shirt or other garment is accurately positioned on the pressing pad so that each operator may be concerned only with a particular operation. The pads are held taut by means of the springs and hence furnish a smooth support for the work. Work of different sizes may be readily adjusted for and the feeding of the work from station to station greatly expedites the operations of ironing and finishing the shirt.

While the system and apparatus are primarily intended for use in the manufacture of shirts, particularly the ironing, folding and pinning of new shirts preparatory to packaging, the invention is obviously of broader applicability and I do not wish to be limited to the particular use or to the particular details of construction described.

What I claim is:

1. In a conveyor system for shirt pressing comprising spaced rotary drums, an endless flexible belt conveyor having upper and lower stretches mounted on said drums, a plurality of flexible pressing pads thereon, said pads being fixed to said conveyor at their middle portions only, resilient connections between adjacent pads, pairs of fastening devices at each end of each pad for holding a shirt on said pad, said fastening devices being adjustable laterally of said pads, fastening devices at the sides of each pad for holding the sides of a shirt and a mounting plate between the fastening devices at the front of each pad for supporting a substitute shirt holding device.

2. In a conveyor system for pressing and the like, an endless flexible belt conveyor, a plurality of pressing pads thereon, said pads being fixed to said conveyor at their middle portions only, resilient connections between adjacent pads and a pair of fastening devices at each end of each pad for holding an article on said pad, said devices comprising base plates, each having a slot extending laterally of said pads and portions overlapping the ends of said pads and each having a hook for easy engagement with and disengagement from the work, a bolt extending through each of said slots and through said conveyor and a nut on each bolt for securing said plate.

3. In a conveyor system for pressing and the like, an endless flexible belt conveyor, a plurality of pressing pads thereon, said pads being fixed to said conveyor at their middle portions only, resilient connections between adjacent pads and a pair of fastening devices at each end of each pad for holding an article on said pad, said devices comprising base plates, each having a slot extending laterally of said pads and portions overlapping the ends of said pads and each having a hook for easy engagement with and disengagement from the work, a bolt extending through each of said slots and through said conveyor and a nut on each bolt for securing said plate, and a plate between the base plates of the fastening devices at the forward end of each pad, said plate having a channel to receive the supporting arm of a substitute work holder.

4. A conveyor system for pressing and the like comprising spaced rotary drums, an endless flexible belt conveyor having upper and lower stretches mounted on said drums, a plurality of flexible pads secured to said conveyor at their middle portions only and adapted to move with said conveyor around said drums, and resilient connecting members connecting the ends of adjacent pads.

5. A conveyor system for pressing and the like comprising spaced rotary drums, an endless flexible belt conveyor having upper and lower stretches mounted on said drums, a plurality of flexible pads thereon, said pads being secured to said conveyor along their transverse medial portions only and adapted to move with said conveyor around said drums, fastening devices on each pad for holding an article on said pad, and resilient connecting members connecting the ends of adjacent pads.

ALBERT MAESCHER.